March 17, 1959 W. H. G. EICK 2,878,358

AUTOMATIC TUNING OF HIGH FREQUENCY APPARATUS

Filed April 13, 1955

INVENTOR.
W. H. G. EICK
BY R. P. Morris
ATTORNEY

United States Patent Office 2,878,358

Patented Mar. 17, 1959

2,878,358

AUTOMATIC TUNING OF HIGH FREQUENCY APPARATUS

Wolfgang Horst Georg Eick, Berlin-Tempelhof, Germany, assignor to International Standard Electric Corporation, New York, N. Y., a corporation of Delaware Application April 13, 1955, Serial No. 501,038

Claims priority, application Germany April 15, 1954

3 Claims. (Cl. 219—10.77)

This invention relates to means for automatically tuning an oscillator.

High frequency dielectric heating has been used to heat animate or inanimate bodies by means of high frequency (H.-F.) oscillations wherein the oscillatory circuit of the generator is loaded with the body under treatment. Tuning of the generator is effected by the change in the body under treatment. For example, if the high frequency heating apparatus is being used to dry wood, then the wood, as its content of moisture is changing, causes variations in the tuning of the generator. Another example is an animate body changing its position while undergoing diathermy treatment. The oscillatory circuit of both examples is being detuned during operation and therefore, frequent retuning is necessary.

Automatic tuning means are known for maintaining the oscillatory circuit at the resonant frequency. However, most of the automatic tuning circuits known require expensive gearing between the motor and oscillator.

It is an object of this invention to provide an automatic tuning means which is simpler, more economical and equally as efficient as the known tuning means.

In accordance with the invention, the motor driving the tuning means is reversed by a simple relay known as a stepping or interlocked relay. Such a relay, when excited, causes a switch to change from one of two possible positions to the other and remain in the latter position until the relay is again excited. When the relay is again energized, the switch is restored to the former position and then remains in this position until the relay is de-energized.

Figure 1:
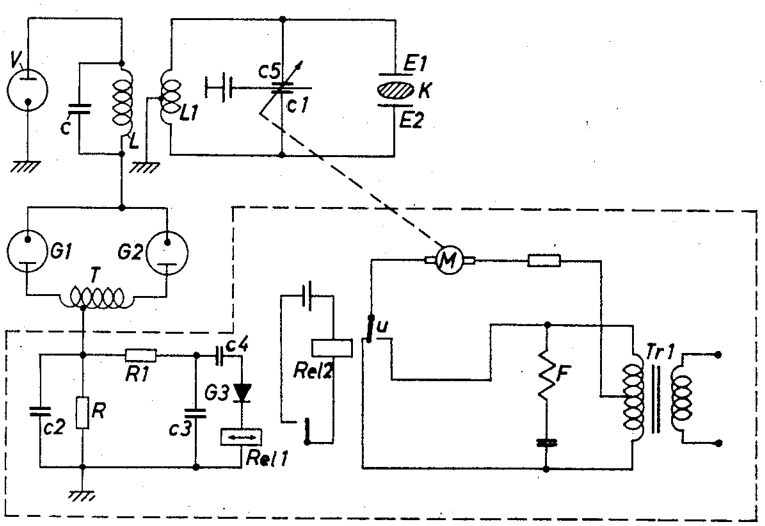
Figure 2:
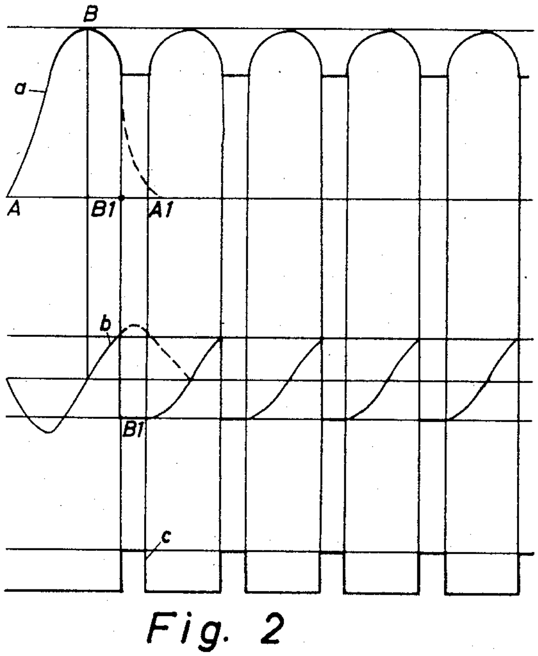

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 is a schematic diagram of one embodiment of the invention; and Fig. 2 is graphs illustrating the voltages as they appear at various places in the circuit shown in Fig. 1.

Referring to Fig. 1, the generator comprises an electron tube V, a condenser C and a coil L. A utilization circuit comprising a tuned circuit $L_1$ and $C_1$ is coupled across electrodes $E_1$ and $E_2$ positioned on either side of a body K. The condenser $C_1$ is preferably a rotary plate condenser. $L_1$ constitutes the secondary of the transformer coupling between the generator and the utilization circuit.

The anode voltage for the electron tube V is applied thereto over a circuit arrangement comprising rectifiers $G_1$, $G_2$ and a transformer T, whose secondary coil only is shown in Fig. 1. A resistor R is connected in series with rectifiers $G_1$ and $G_2$. When the tuned circuit $L_1$ and $C_1$ of the utilization circuit is operating at the resonant frequency, and if the tuned circuit L and C are also operated at the resonant frequency, a high voltage will appear across resistor R because the anode current of the tube V is maximum. The voltage across resistor R is used as the control voltage for reversing motor M by which the capacitor $C_1$ is driven.

The voltage across resistor R is filtered by capacitors $C_2$, $C_3$ and resistor $R_1$, and is differentiated by capacitor $C_4$. The differentiated voltage is applied to a relay Rel 1 which controls the circuit of an interlocked relay Rel 2. The relay Rel 2 is arranged to operate a change-over switch U each time a control pulse acts upon it. Switch U is included in the circuit of motor M. The motor is fed over a transformer Tr 1.

If the voltage on condenser $C_1$ is varied, as, for example, from point A, Fig. 2 to point $A_1$, then at point B it reaches the resonance tuning of circuit $L_1$, $C_1$. The voltage at resistance R hence rises from the zero point A to its greatest value, represented by point B, and then returns to zero at point $A_1$. This voltage if differentiated assumes the shape of curve *b*. On insertion the voltage rises from zero to its greatest value, then decreases and finally reaches at point $B_1$ a negative value which is such as to cause the relay Rel 1 to respond, this relay being sensitive to currents of only one direction. Accordingly, the circuit of relay Rel 2 will be closed and contact U thus be switched over. The voltage appearing at relay Rel 2 is designated *c* and is an impulse voltage apt to operate the interlocked relay Rel 2. Through the switching-over of contact U the voltage *b* decreases to zero. On termination of the switching-over operation the voltage *b* has reassumed its greatest positive value. The motor starts and moves the condenser $C_1$, which thus passes through its resonance point, until voltage *b* will have again reached a defined negative value. Now relay Rel 1 re-energizes, whereby another pulse is produced in the circuit of relay Rel 2. This pulse acts to reverse the motor.

Evidently the points of reversal of the motor should be as close together as practicable. Against this requirement is the fact that the voltage at resistance R and thus the current for Rel 1 will be very small. Therefore relay Rel 1 should be of the highest possible sensitivity. This relay must also be so constructed as to respond to none but voltages of a predetermined direction. To achieve this, a rectifier G3 may be connected in series with that relay, but this rectifier, indicated in Fig. 1, causes loss of voltage and is hence in many cases undesirable. To increase the sensitivity of responding whilst avoiding the use of a rectifier, the relay Rel 1 should be polarized. Polarized relays are more sensitive than those non-polarized. The polarized relay Rel 1 is so connected that the relay Rel 2 shall be inserted by it only if there arrive negative values of the control voltage. By relay Rel 2 the switch U is then operated as described. F denotes the field winding of motor M.

The arrangement according to the invention thus merely requires the provision of two relays Rel 1, Rel 2, a differentiating condenser C4, a resistance R, and of some means serving to filter the voltage appearing at this resistance. These filter means need be dimensioned for very low power only, so there will be no considerable increase of the expenditure in means.

While I have described above the principles of my invention in connection with specific apparatus, it is to be clearly understood that this description is made only by way of example and not as a limitation of the scope of my invention as set forth in the objects thereof and in the accompanying claims.

What is claimed is:

1. In combination, an oscillator operating at a single resonant frequency for dielectric heating a load and having a fixed tuned circuit connected thereto, a utilization circuit coupled to said tuned circuit and having a variable tuning element therein for adjusting the frequency thereof to the oscillator resonant frequency, a variable load connected to said variably tuned circuit comprising a pair of plates with a dielectric body therebetween, a resistor connected to the fixed tuned circuit and providing a control voltage which is high at the resonant frequency, a rectifier and polarized relay connected to said resistor, an interlocked relay controlled by said polarized relay, and a reversible motor controlled by said interlocked relay to operate the variable tuning element to maintain the oscillator frequency fixed as the load varies.

2. The circuit of claim 1, and a differentiating condenser connected in series with the polarized relay, and switch contacts of said polarized relay connected in series with said interlocked relay.

3. The circuit of claim 1, wherein said rectifier is connected in series with said polarized relay, and a change-over switch for said motor actuated by said interlocked relay.

References Cited in the file of this patent

UNITED STATES PATENTS

| | | |
|---|---|---|
| 2,098,069 | Stewart | Nov. 2, 1937 |
| 2,251,064 | Martin et al. | July 29, 1941 |
| 2,349,370 | Orner | May 23, 1944 |
| 2,387,544 | Usselman | Oct. 23, 1945 |
| 2,548,731 | Lehde | Apr. 10, 1951 |
| 2,753,503 | Wideroe | July 3, 1956 |

OTHER REFERENCES

Ser. No. 363,862, Dolle et al. (A. P. C.), published May 25, 1943.